(12) United States Patent
Smith et al.

(10) Patent No.: US 7,290,050 B1
(45) Date of Patent: Oct. 30, 2007

(54) TRANSPARENT LOAD BALANCER FOR NETWORK CONNECTIONS

(75) Inventors: Cameron Smith, Redwood City, CA (US); Vilis Ositis, Sunol, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 736 days.

(21) Appl. No.: 10/252,061

(22) Filed: Sep. 20, 2002

(51) Int. Cl.
G06F 15/173 (2006.01)
G06F 9/46 (2006.01)

(52) U.S. Cl. ...................................... 709/224; 718/105

(58) Field of Classification Search ........ 709/223–224; 718/105
See application file for complete search history.

(56) References Cited

U.S. PATENT DOCUMENTS

| | | | | |
|---|---|---|---|---|
| 5,774,660 | A | * | 6/1998 | Brendel et al. ............. 709/201 |
| 5,781,550 | A | * | 7/1998 | Templin et al. ............. 370/401 |
| 5,915,087 | A | * | 6/1999 | Hammond et al. ........... 726/12 |
| 6,006,264 | A | * | 12/1999 | Colby et al. ................ 709/226 |
| 6,006,272 | A | * | 12/1999 | Aravamudan et al. ...... 709/245 |
| 6,023,563 | A | * | 2/2000 | Shani ......................... 709/249 |
| 6,061,728 | A | * | 5/2000 | Mead et al. ................. 709/227 |
| 6,792,463 | B1 | * | 9/2004 | Lamberton et al. ......... 709/227 |
| 7,143,169 | B1 | * | 11/2006 | Champagne et al. ....... 709/226 |
| 7,146,354 | B1 | * | 12/2006 | Tennican et al. ............... 707/3 |
| 2002/0015387 | A1 | * | 2/2002 | Houh ......................... 370/250 |
| 2002/0038339 | A1 | * | 3/2002 | Xu ............................. 709/203 |
| 2003/0028642 | A1 | * | 2/2003 | Agarwal et al. ............ 709/226 |

OTHER PUBLICATIONS

Kopparapu, "Load Balancing Serves the Farms", Jan. 24, 2000, Electronic Engineering Times, 100, ISSN: 0192-1541.*
Schroeder, Goddard and Ramamurthy, "Scalable Web Server Clustering Technologies", IEEE Network, (May/Jun. 2000).*
Fox et al., "Cluster-Based Scalable Network Services", Proc. 16th ACM Symp. Op. Sys. Principals, (Oct. 1997).*
Dias et al., "A Scalable and Highly Available Server", CAPON, 1996.*
Damani et al., "Techniques For Hosting A Service On A Cluster Of Machines", Proc. 6th Intl. WWW Conf., (Apr. 1997).*

(Continued)

Primary Examiner—David Wiley
Assistant Examiner—J. Bret Dennison
(74) Attorney, Agent, or Firm—Sonnenschein Nath & Rosenthal LLP

(57) ABSTRACT

A transparent load balancer receives incoming Ethernet frames having incoming source and destination IP and MAC addresses. The load balancer diverts the incoming frames to one of several multi-application platforms. The incoming frames are communicated across a first TCP connection that terminates on a multi-application platform. The first TCP connection is defined by TCP source and destination ports. The transparent load balancer receives outgoing frames from the multi-application platform and outputs the outgoing frames with source and destination IP and MAC addresses that are identical to the incoming source and destination IP and MAC addresses. The outgoing frames are communicated across a second TCP connection, the second TCP connection being defined by the same TCP source port and TCP destination port of the first TCP connection. The transparent load balancer and multi-application platforms can be inserted into a running network without noticeable interruption to devices on the network.

18 Claims, 7 Drawing Sheets

OTHER PUBLICATIONS

Hunt et al., "Network Dispatcher: A Connection Router For Scalable Internet Services", Comp. Networks and ISDN Sys., (Sep. 1999).*

Gan et al., "LSMAC vs. LSNAT: Scalable Cluster-based Web Servers", Cluster Comp. J. Networks, Software Tools and Apps., (2000).*

Gan & Ramamurthy, "LSMAC: An Improved Load Sharing Network Service Dispatcher", World Wide Web Journal, (Feb. 2000).*

Srisuresh & Gan, "RFC 2391, Load Sharing Using Network Address Translation (LSNAT)", The Internet Soc. (Aug. 1998).*

"The Magicrouter, An Application Of Fast Packet Interposing", 2nd Symp. Op. Sys. Design and Implementation, (May 17, 1996).*

"Locality-Aware Request Distribution In Cluster-based Network Servers" • Proc. ACM 8th Int'l. Conf. Architectural Support for☐☐ Prog. Langs. and Op. Sys. • (Oct. 1998).*

"Design And Performance Of A Web Server Accelerator" IEEE INFOCOM '99, (1999).*

* cited by examiner

TRANSPARENT LOAD BALANCER FOR NETWORK CONNECTIONS

TECHNICAL FIELD

The present invention relates to terminating and sending messages transparently over a transport layer. More specifically, the invention relates to transparently load balancing messages among a plurality of platforms that execute application layer programs on the messages.

BACKGROUND

FIG. 1 (prior art) is a diagram of an internetwork 10 including two local area networks (LANs) 12 and 14 connected by the Internet 16. A client 18 on LAN 12 wishes to retrieve data from a web server 20 on LAN 14. The client 18 makes a request for the data to a transparent proxy 26 instead of directly to the web server 20. The request passes through a load balancer 24 on its way to transparent proxy 26. The transparent proxy 26, in turn, makes a new request for the data through gateway 22 to web server 20 on behalf of client 18. Web server 20 returns the data to transparent proxy 26, and transparent proxy 26 forwards the data to client 18. The data can be analyzed by application level software executing on the transparent proxy 26. For example, anti-virus software can analyze the data. The transparent proxy does not forward the data to client 18 if a virus is detected.

If the transparent proxy 26 is overloaded, the load balancer 24 forwards a subsequent request to transparent proxy 28 instead of to transparent proxy 26. In this case, the transparent proxy 28, makes a new request for the data to web server 20 on behalf of client 18. Web server 20 returns the data to transparent proxy 28, and transparent proxy 28 forwards the data to client 18.

Web server 20 receives messages from "transparent" proxies 26 and 28 that include the IP addresses of transparent proxies 26 and 28, respectively. Therefore, transparent proxies 26 and 28 are not transparent to web server 20. Web server 20 cannot distinguish among messages from individual clients. Because the original sender of messages coming from transparent proxies 26 and 28 cannot be determined from the source IP address, customizing services towards individual clients is more difficult.

In addition, a conventional load balancer also hinders the transparency as to IP addresses of transparent proxies 26 and 28 with respect to client 18. Transparent proxies 26 and 28 forward the requested data to client 18 in messages containing the source IP address of web server 20, instead of the source IP addresses of transparent proxies 26 and 28, respectively. The load balancer 24, however, forwards the messages to client 18 with the source IP address of the load balancer. In this case, client 18 cannot simply return response messages to the source IP address of web server 20, but must be configured to send such messages through load balancer 24.

Load balancer 24 can be adapted to have the transparency functionality of the transparent proxies 26 and 28 so that load balancer 24 also forwards messages to client 18 containing the source IP address of web server 20. Even in this case, however, load balancer 24 is not transparent with respect to Ethernet hardware addresses, also called MAC addresses.

In the case where the requested data is sent from web server 20 to client 18 through transparent proxy 26, a first TCP connection is established between client 18 and transparent proxy 26, and a second TCP connection is established between transparent proxy 26 and web server 20. When Ethernet frames are received onto client 18 across the first TCP connection, they contain the source MAC address of the load balancer 24 and not the source MAC address of gateway 22. Frames received directly from transparent proxy 26 would also not contain the source MAC address of gateway 22. Thus client 18 is hindered from gathering the MAC addresses of other devices on LAN 12, such as the gateways out of LAN 12. When load balancer 24 is added to LAN 12, client 18, as well as the other clients on LAN 12, must be reconfigured to send requests to the MAC address of the load balancer.

Expertise and effort are therefore required to operate and maintain a LAN network where clients communicate through a load balancer that is not transparent. This is undesirable.

SUMMARY

A transparent load balancer receives incoming Ethernet frames having incoming source and destination IP addresses and incoming source and destination MAC addresses. The transparent load balancer diverts the incoming frames to one of several multi-application platforms according to a load-balancing algorithm. The incoming frames are communicated across a first TCP connection that terminates on the chosen multi-application platform. The first TCP connection is defined by TCP source and destination ports. The transparent load balancer receives outgoing frames from the chosen multi-application platform and outputs the outgoing frames with source and destination IP addresses and source and destination MAC addresses that are identical to the incoming source and destination IP address and source and destination MAC addresses. The outgoing frames are communicated across a second TCP connection that is defined by the same TCP source port and TCP destination port as that of the first TCP connection.

In one embodiment, a transparent load balancer is combined with multiple multi-application platforms to form a system. Pairs of TCP connections are terminated on the system, whereby for each pair of TCP connections a single multi-application platform is the terminus of a first TCP connection as well as the origin of a second TCP connection. The particular multi-application platform establishes the first TCP connection by sending signaling messages having the source IP address and the source MAC address of the terminus of the second TCP connection. Ethernet frames transmitted by the transparent load balancer over the second TCP connection have the source IP address and the source MAC address of the origin of the first TCP connection. Thus, the system is transparent to both the origin of the first TCP connection and to the terminus of the second TCP connection.

In another embodiment, the multi-application platforms execute application layer programs that perform functions other than searching for viruses in data communicated across TCP connections. For example, the multi-application platforms filter out data that contains a specified content, such as voice communication data in which a specified word is spoken.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
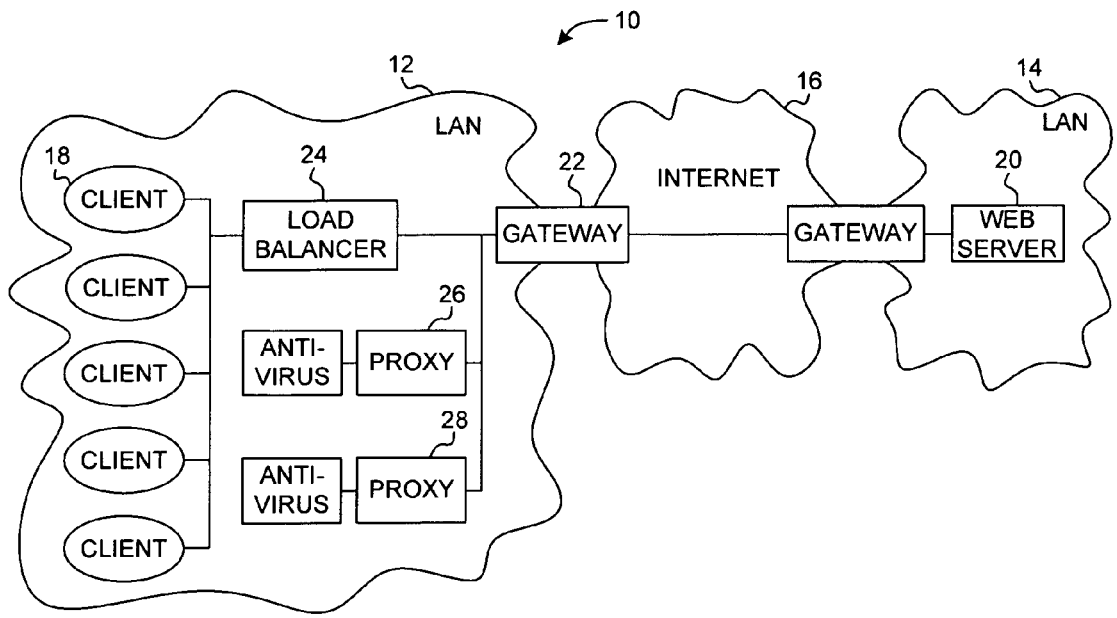
FIG. 1 (prior art) is a diagram of a client connected to a web server through a load balancer and a transparent proxy that executes an anti-virus application.
Figure 2:
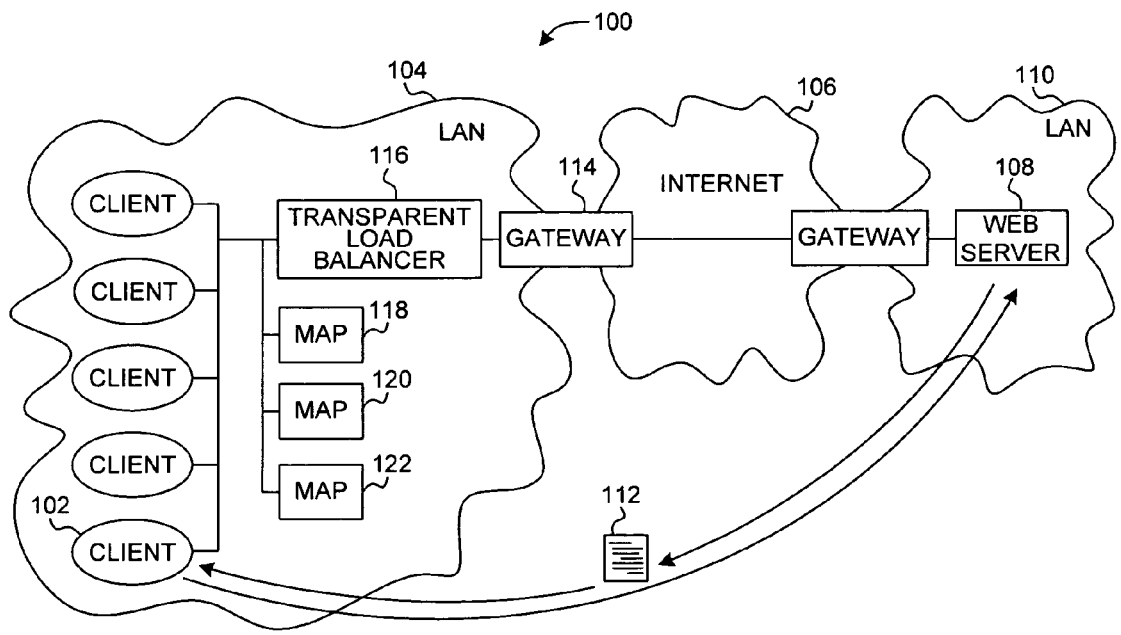
FIG. 2 is a diagram of a client connected to a web server through a transparent load balancer and a multi-application platform.

Reference will now be made in detail to some embodiments of the invention, examples of which are illustrated in the accompanying drawings. FIG. 2 is a diagram of an internetwork 100 in which a client 102 on LAN 104 is connected by Internet 106 to a web server 108 on a LAN 110. Client 102 wishes to retrieve a webpage 112 from web server 108. Web pages are generally transmitted via TCP connections, and client 102 begins by setting up a TCP connection in order to retrieve webpage 112. Client 102 accesses the Internet 106 via a gateway 114. A transparent load balancer 116 is located between client 102 and gateway 114. Also located on LAN 104 are three multi-application platforms 118, 120 and 122 that use application layer programs to analyze data communicated across TCP connections.

If client 102 knows only the name of webpage 112, client 102 can send out a domain name system (DNS) request containing an ASCII string identifying the web server that serves up webpage 112. A DNS server somewhere on Internet 106 returns the 32-bit IP address for web server 108, in this example 123.0.0.1. Client 102 then sends out an address resolution protocol (ARP) request containing the IP address (10.0.0.4) of gateway 114 asking for the corresponding 48-bit Ethernet hardware address of gateway 114, referred to here as the destination MAC address. Gateway 114 responds with its MAC address, in this example WXYZ. Client 102 then sends a SYN message to initiate the setup of a TCP connection with web server 108.

Figure 3:
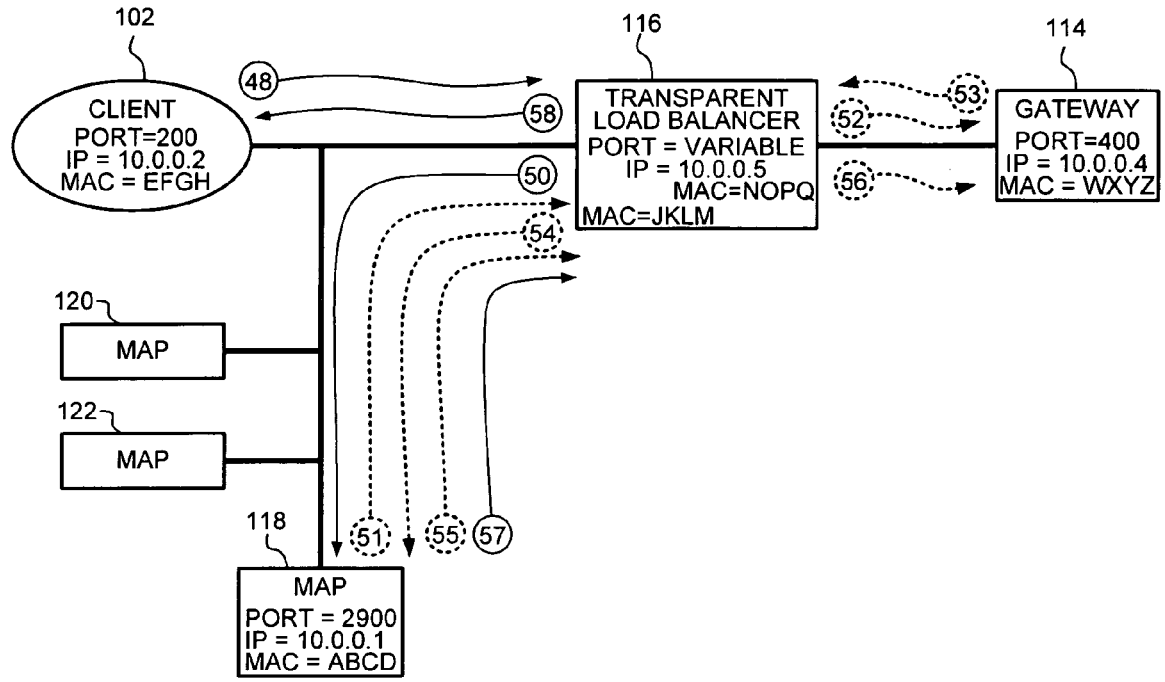
FIG. 3 is a block diagram showing the initial protocol messages used to set up TCP connections between the client and the web server of FIG. 2.

FIG. 3 illustrates the preliminary TCP connection setup messages used to set up TCP connections between client 102 and web server 108. The TCP messages sent by client 102 are intercepted by transparent load balancer (TLB) 116. TLB 116 then forwards all TCP connection setup messages that are related to the same TCP connection to a particular multi-application platform that is not overloaded.

There are various algorithms for distributing messages among multiple devices in order to balance the load over those devices. The load may be the number of computations that is to be performed by all of the devices. When the computational capacity of a certain device has been reached, for example, a load balancer can send subsequent messages to a different device. The load can also be the number of TCP connections that are to terminate or originate on all of the devices. Where the load is measured as the number of TCP connections, messages can be distributed according to their destination IP addresses. In this embodiment, TCP messages with destination IP addresses whose subparts sum to an even integer, e.g., 123.0.0.1, are routed by load balancer 116 to multi-application platform (MAP) 118.

Client 102 sends out SYN message 48 having the destination MAC address of gateway 114 and the destination IP address of web server 108. As shown in FIG. 3, SYN message 48 is intercepted by TLB 116. Based on a load balancing algorithm, TLB 116 forwards SYN message 48 as SYN message 50 to MAP 118. In this example, SYN message 48 is diverted as SYN message 50 to MAP 118 following the load balancing algorithm because the destination IP address of SYN message 48 is 123.0.0.1.

Although SYN message 48 would normally initiate the setup of a TCP connection between client 102 and web server 108, MAP 118 initiates setting up two TCP connections upon receiving SYN message 50: a first TCP connection between client 102 and MAP 118, and a second TCP connection between MAP 118 and web server 108.

Figure 4:
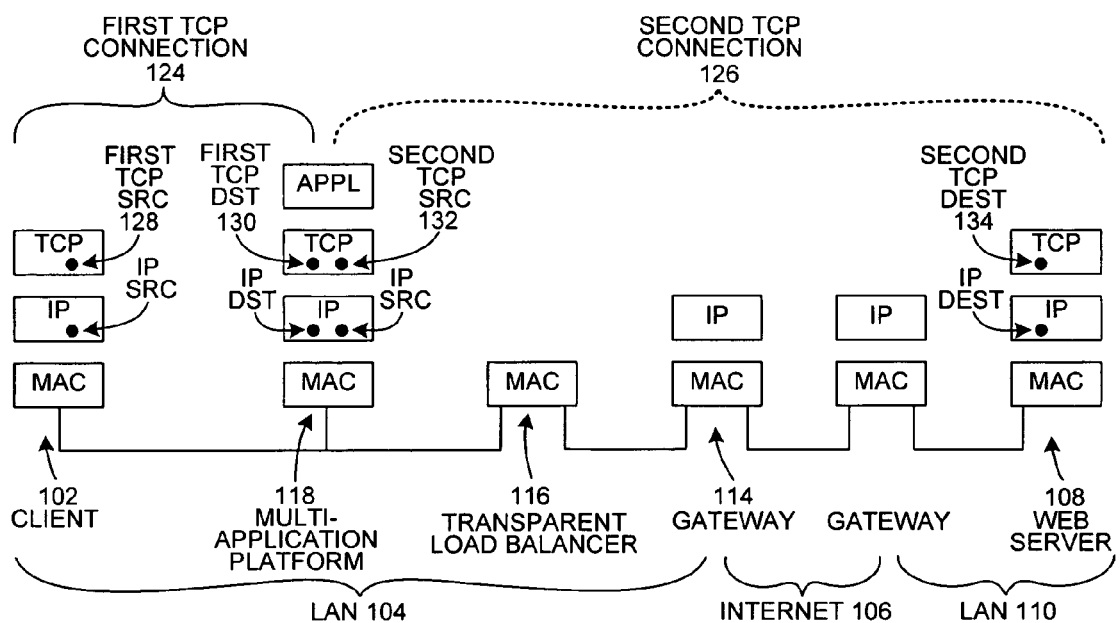
FIG. 4 is a diagram showing the protocol layers over which the TCP connections of FIG. 3 are established.

FIG. 4 shows the protocol layers over which the two TCP connections are established between client 102 and web server 108. The first TCP connection 124 is established between a first source TCP address 128 and a first TCP destination address 130. The second TCP connection 126 is established between a second source TCP address 132 and a second destination TCP address 134. TCP addresses are also called "TCP ports," which are not to be confused with physical ports. Messages received by TLB 116 that are communicated across TCP connection 124 have the same TCP source and destination addresses as messages output by TLB 116 that are communicated across TCP connection 126. Messages received and sent out by MAP 118, however, have different TCP source and destination addresses than messages received and sent out by TLB 116 across the same TCP connections 124 and 126.

Returning to FIG. 3, in this embodiment, MAP 118 first determines whether TCP connection 126 can be established with web server 108 before proceeding to establish TCP connection 124 with client 102. In other embodiments, TCP connection 124 can be established before confirming that a TCP connection can be established with web server 108. Without such confirmation, a SYN ACK message is sent to client 102 that is possibly a "false positive" acknowledgement.

In the present embodiment, MAP 118 sends SYN message 51 to TLB 116, which forwards message 51 as SYN message 52 to web server 108 via gateway 114. Gateway 114 responds via gateway 114 with SYN ACK message 53, which is received by TLB 116. SYN ACK message 53 is addressed to client 102, but TLB 116 forwards it as SYN ACK message 54 to MAP 118. MAP 118 responds to message 54 with RST message 55, which is forwarded by TLB 116 as RST message 56 via gateway 114 to web server 108. RST message 56 resets the TCP connection setup process, and no TCP connection is established with web server 108 at this time. Alternatively, MAP 118 can return a negative acknowledgement NACK message to web server 108, which would also result in the TCP connection setup process being interrupted. MAP 118 then continues setting up TCP connection 124 by sending SYN ACK message 57 to TLB 116. TLB 116 forwards message 57 as SYN ACK message 58 to client 104.

Figure 5A:
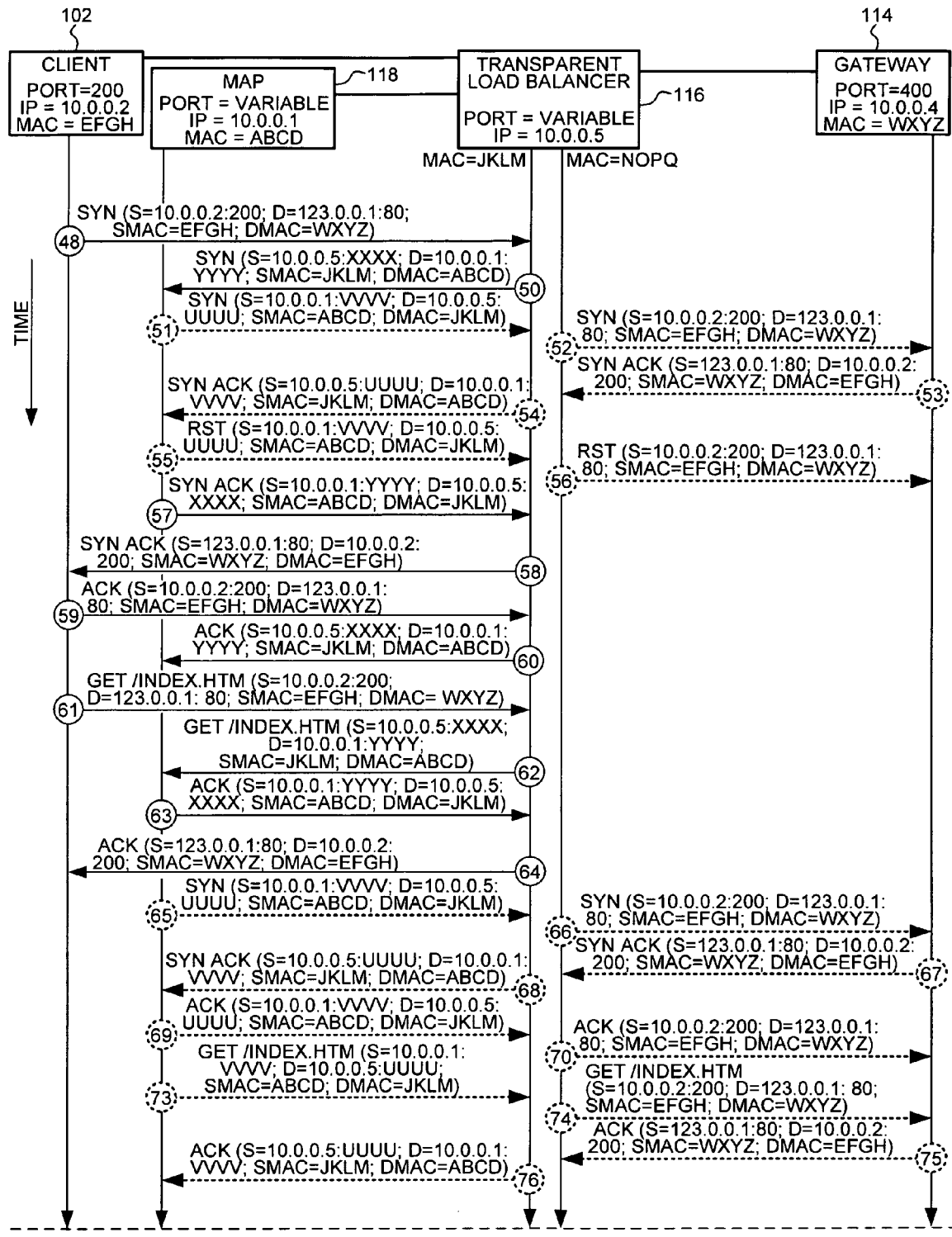
FIGS. 5A and 5B are diagrams showing protocol messages in more detail that are used to set up TCP connections between the client and the web server of FIG. 2.
Figure 5B:
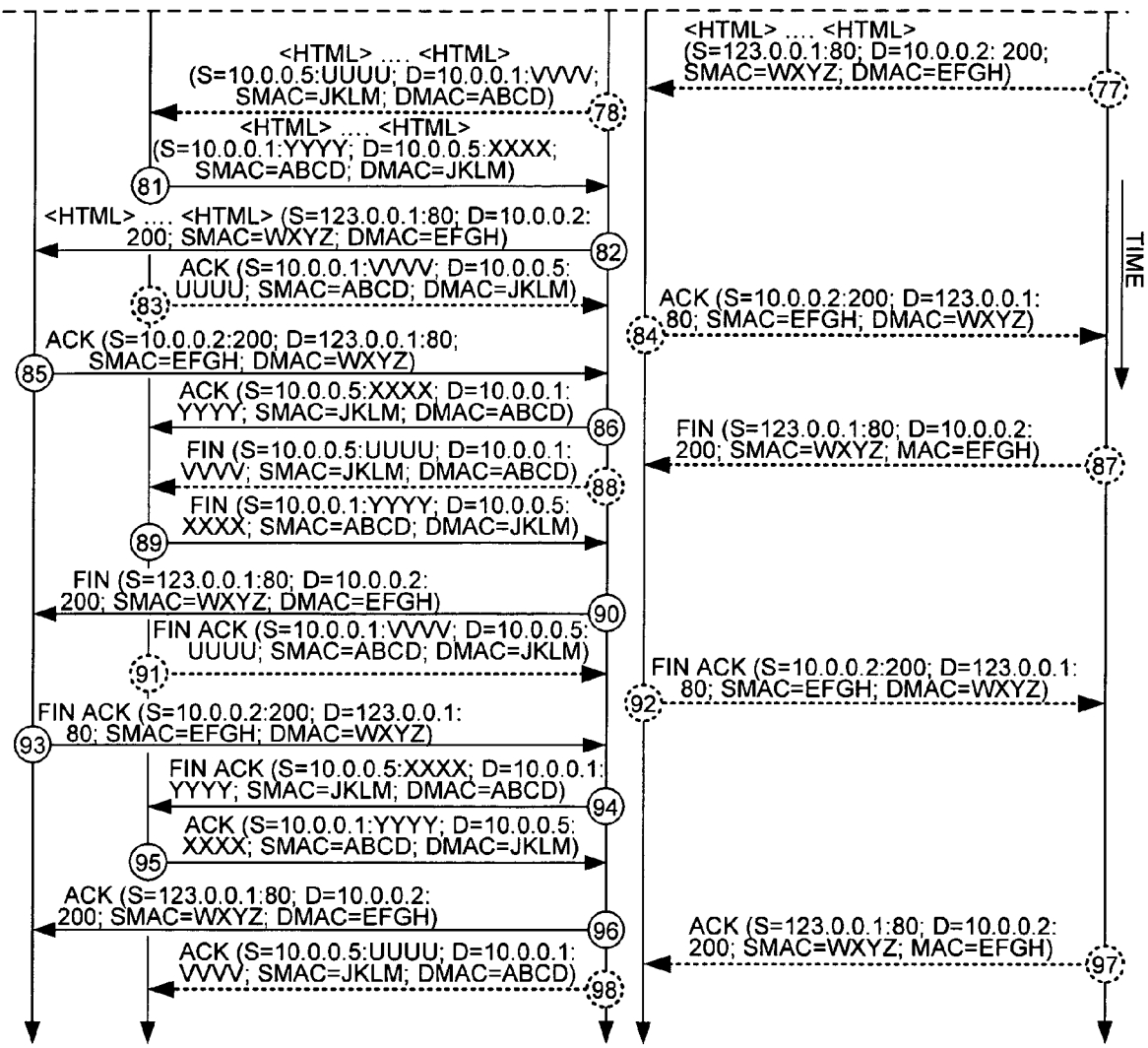

FIGS. 5A and 5B illustrate the TCP connection setup messages for TCP connections 124 and 126 in more detail. Client 102 responds to SYN ACK message 58 with ACK message 59. TLB 116 forwards message 59 as ACK message 60 to MAP 118. SYN messages 48 and 50, SYN ACK messages 57 and 58 and ACK messages 59 and 60 thereby establish the first TCP connection 124 between client 102 and MAP 118. Messages relating to the first TCP connection 124 are designated by solid arrows in FIGS. 3, 5A and 5B, whereas messages relating to the second TCP connection 126 are designated by dashed arrows.

TLB 116 has responded to client 102 with SYN ACK message 58 as though message 58 came straight from gateway 114. Thus SYN ACK message 58 has a source MAC address of gateway 114, in this example WXYZ, instead of the MAC address of TLB 116, in this example JKLM. Furthermore, SYN ACK message 58 has a source IP address of web server 108, in this example 123.0.0.1, instead of the IP address of TLB 116, in this example 10.0.0.5. Thus, TLB 116, as well as MAP 118, is transparent to client 102.

After the first TCP connection 124 has been established, client 102 makes a GET request 61 for an HTML document from the web server 108, which is forwarded as GET message 62 to MAP 118. MAP 118 acknowledged GET message 62 with ACK message 63, which is forwarded as ACK message 64 by TLB 116 to client 102.

GET message 62 now gives MAP 118 a reason to establish the second TCP connection 126, which connects MAP 118 to the web server 108. MAP 118 sends a SYN message 65, which is forwarded by TLB 116 as SYN message 66 towards web server 108. SYN message 66 has source and destination addresses identical to that of SYN message 48 sent by client 102. SYN message 66 is transmitted through the Internet 106, and ultimately a SYN ACK message is received by gateway 114 acknowledging that web server 108 has received SYN message 66. TLB 116 receives SYN ACK message 67 from gateway 114 and forwards SYN ACK message 68 to MAP 118. MAP 118 sends an ACK message 69, which TLB 116 forwards as ACK message 70 via gateway 114 to web server 108. SYN messages 65 and 66, SYN ACK messages 67 and 68 and ACK messages 69 and 70 thereby establish the second TCP connection 126 between MAP 118 and web server 108. TLB 116, as well as MAP 118, is transparent to gateway 114 because gateway 114 receives messages from TLB 116 as though they were coming directly from client 102.

TLB 116, as well as the multi-application platforms on LAN 104, is transparent in both directions, as both client 102 and gateway 114 receive messages as though they were receiving the messages directly from the other. This is in contrast to load balancer 24 and transparent proxies 26 and 28 of the prior art, which are not transparent with respect to either IP addresses or MAC addresses in the direction of gateway 22. Moreover, load balancer 24 is transparent only with respect to IP addresses in the direction of client 18 if load balancer 24 is adapted to have the transparency functionality of a transparent proxy. And even in that case, load balancer 24 is not transparent as to MAC addresses.

TLB 116 and multiple multi-application platforms form a system. Because TLB 116 and the multi-application platforms are transparent in both directions, the system can be inserted into a running network without requiring reconfiguration of devices on the network. Ethernet frames of each existing TCP connection are simply diverted by TLB 116 to one of the multi-application platforms, which terminates two TCP connections for each existing TCP connection.

After the second TCP connection 126 is established, MAP 118 sends a GET message 73, making the same GET request contained in GET message 62. TLB 116 forwards GET message 73 as GET message 74 towards web server 108. Web server 108 responds with an ACK message 75, which is forwarded by TLB 116 to MAP 118 as ACK message 76. Then web server 108 sends webpage 112 to client 102 in the form of an HTML document. The HTML document is divided into frame payloads, and each frame payload is sent in an individual Ethernet frame across the second TCP connection 126. Each Ethernet frame received by TLB 116 from gateway 114 contains the source IP address of web server 108 and the source MAC address of gateway 114, such as the frame illustrated as message 77 in FIG. 5B. Message 77 containing a frame payload is forwarded by TLB 116 to MAP 118 as message 78.

The incoming frame payloads that arrive at MAP 118 in separate Ethernet frames are assembled at the TCP layer of MAP 118 to form an incoming data portion, which is the HTML document containing webpage 112. The incoming data portion is stored in a database in the MAP 118 and then sent to the application layer of MAP 118. The application layer analyzes the entire incoming data portion as a unit. For example, an application program for examining an incoming data portion that conforms to HTTP protocol can execute in the application layer of the MAP 118. The application program examines the contents of webpage 112 that was sent in the form of an HTML document using HTTP protocol. The application program looks for computer viruses and identifies all frames that contain viruses. In this way, frames containing computer viruses can be deleted before they are stored on client 102.

After the incoming data portion has been acted upon by an application program, MAP 118 divides the incoming data portion into outgoing frame payloads that are contained in separate Ethernet frames. The outgoing frames are sent by MAP 118 across the first TCP connection 124 via TLB 116 to client 102.

Each Ethernet frame received by client 102 from TLB 116 contains the source IP address of web server 108 and the source MAC address of gateway 114, such as the frame illustrated as message 82 in FIG. 5B. Message 81 containing a frame payload is forwarded by TLB 116 to client 102 as message 82. Thus, executing the anti-virus application on the incoming data portion is carried out transparently. Client 102 receives frames as though TLB 116 is not between client 102 and gateway 114.

Figure 6:
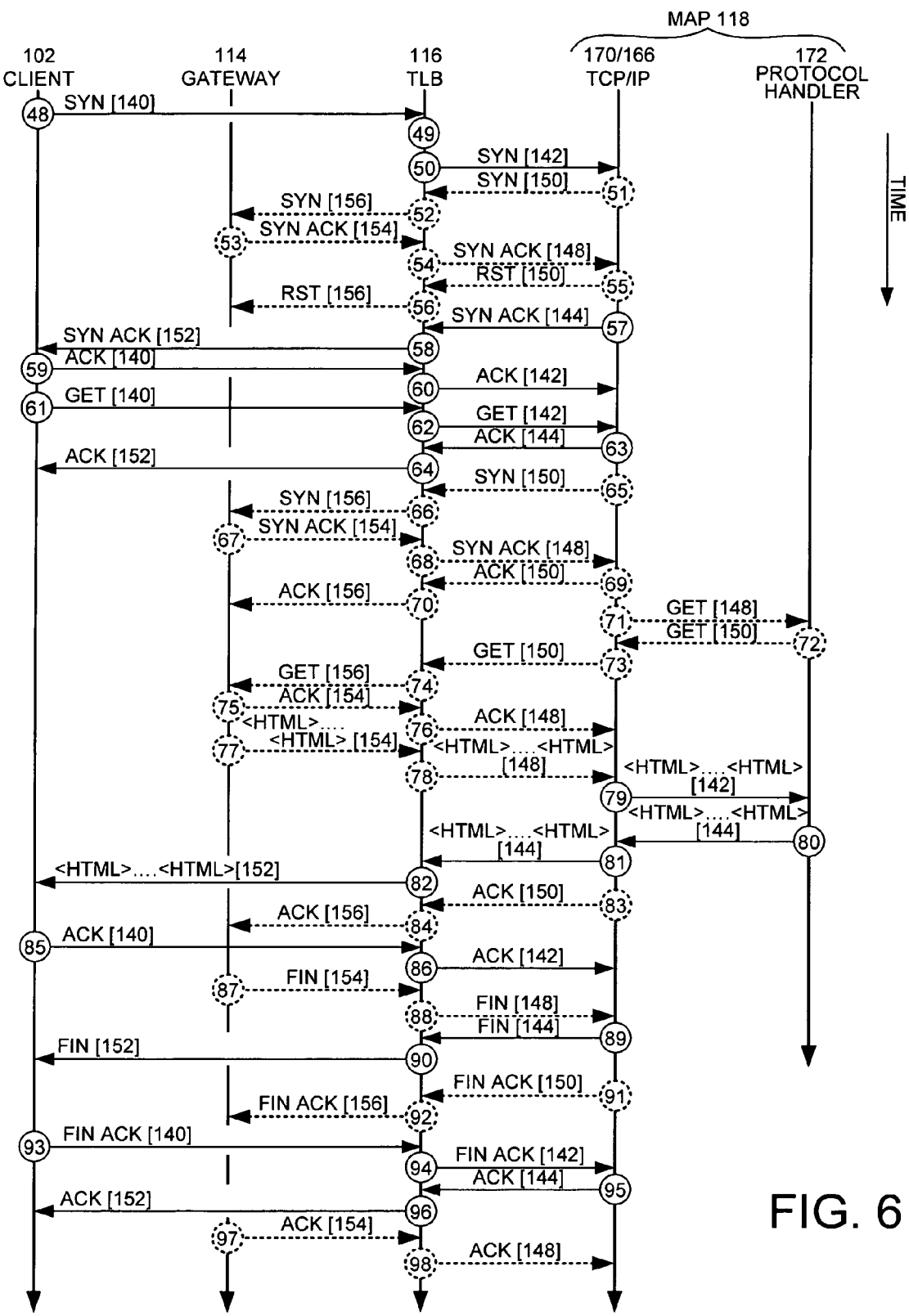
FIG. 6 is a diagram showing some steps in establishing TCP connections through a multi-application platform and the transparent load balancer of FIG. 2.
Figure 7:
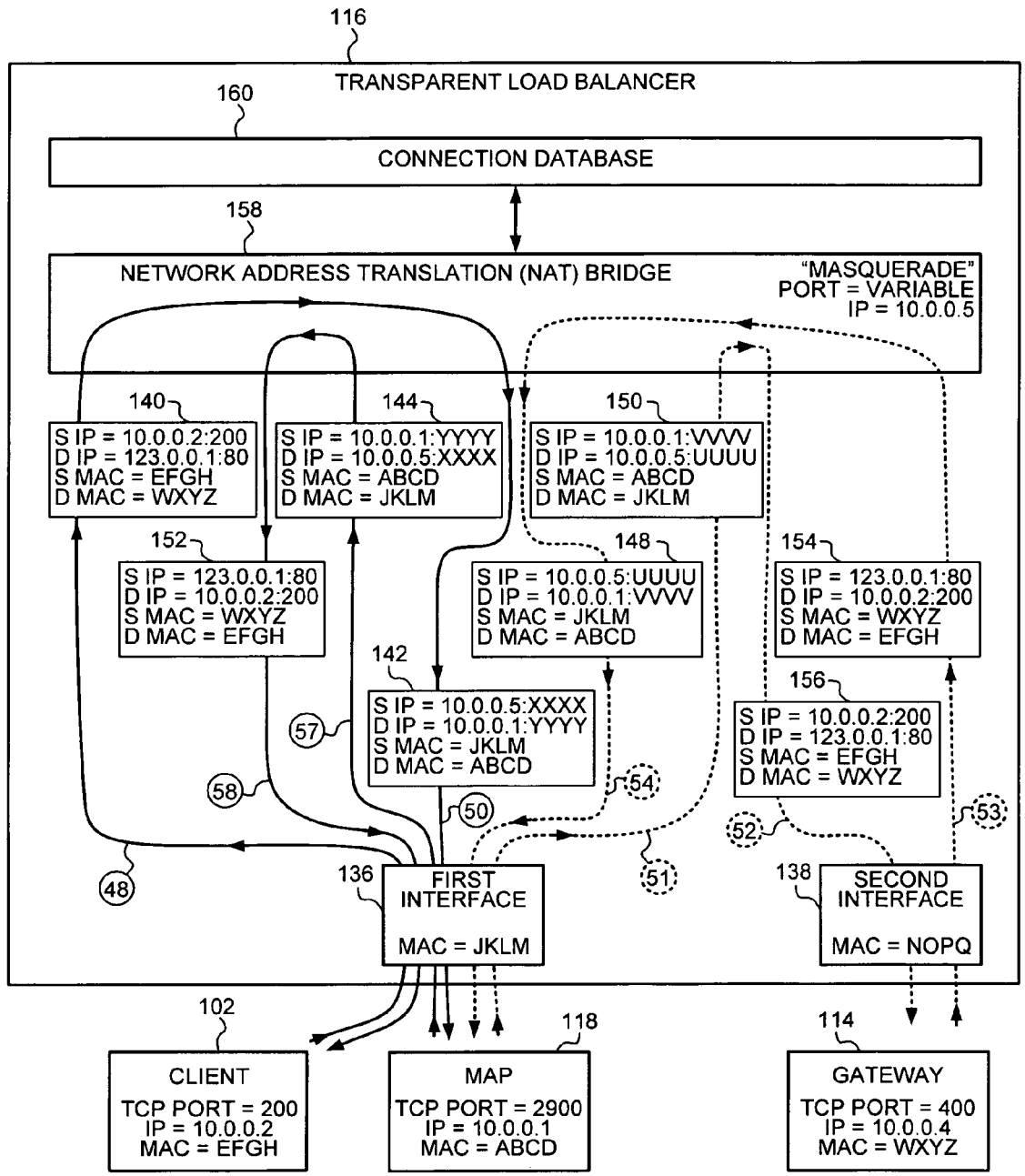
FIG. 7 is a block diagram showing the transparent load balancer of FIG. 2 in more detail, as well as the address blocks of messages sent and received by the transparent load balancer.
Figure 8:
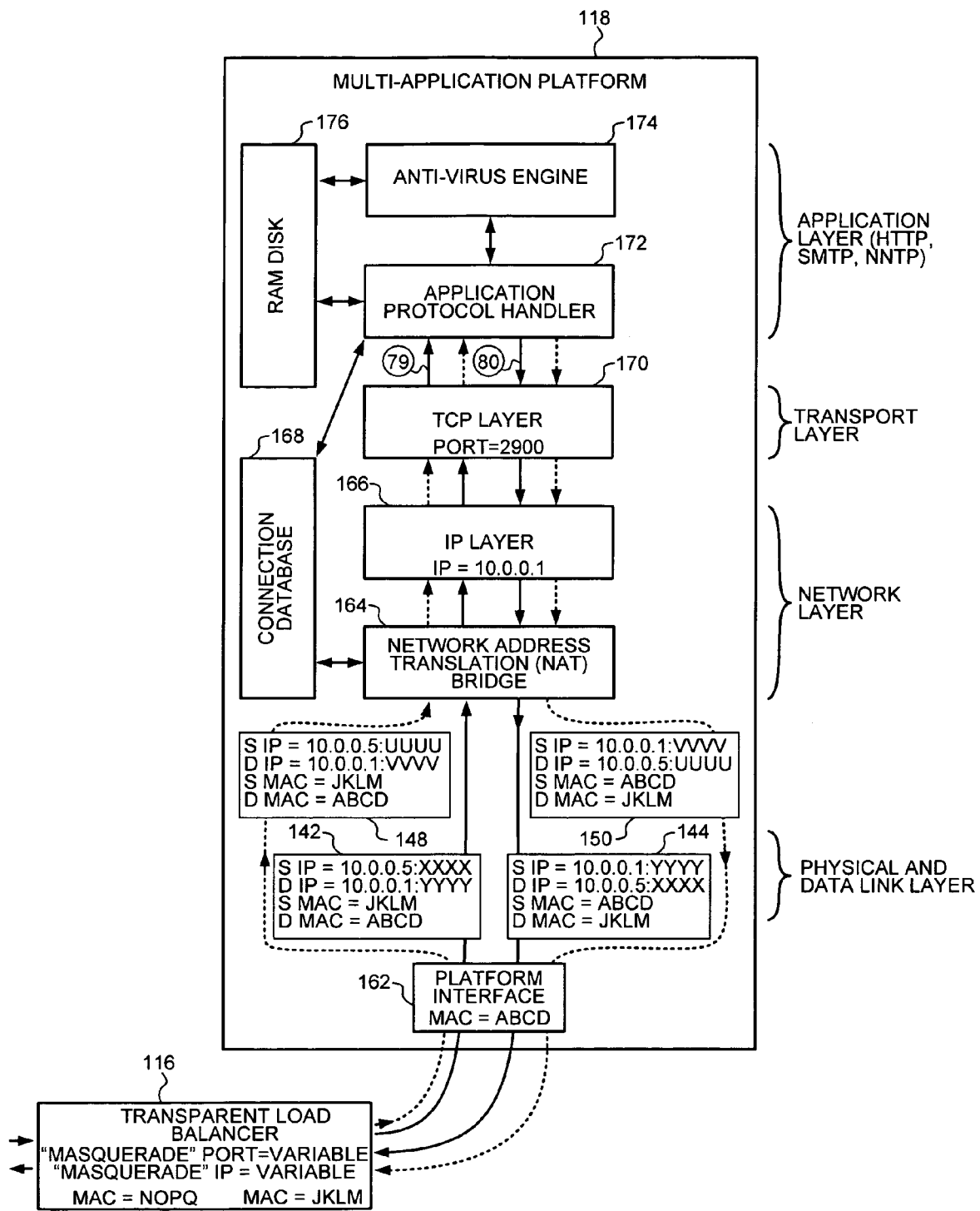
FIG. 8 is a block diagram showing a multi-application platform of FIG. 2 in more detail.

FIG. 6 illustrates steps in the combined operation TLB 116 and MAP 118. These steps can be followed inside TLB 116, as shown in FIG. 7, and in the protocol layers operating in MAP 118, as shown in FIG. 8. The operation of a multi-application platform that is itself transparent is disclosed in U.S. patent application Ser. No. 10/251,101, entitled "Transparent Bridge That Terminates TCP Connections," filed on Sep. 20, 2002 by Hutchison et al. (the subject matter of which is hereby incorporated by reference).

FIG. 7 also shows the components of TLB 116 in more detail, as well as the address blocks of messages received and sent by TLB 116. FIG. 8 also shows the components of MAP 118 in more detail, as well as the address blocks of messages received and sent by MAP 118. As TCP messages are received by TLB 116 and MAP 118, they are processed at various protocol layers. For example, client 102 sends SYN message 48 shown in FIG. 6 to initiate the setup of a TCP connection with web server 108. TLB 116 intercepts setup messages from both client 102 and web server 108 and diverts them to MAP 118, which forms a first TCP connection 124 with client 102 and a second TCP connection 126 with web server 108.

SYN message 48 is received by a first interface 136 of TLB 116, as shown in FIG. 7, and forwarded to a network address translation bridge (NAT) 158. The first interface 136, as well as a second interface 138, can be network interface cards (NIC), each having its own MAC address. In this embodiment, client 102 and MAP 118 communicate with TLB 116 through the first interface 136 and are on the same subnet. Gateway 114 communicates with TLB 116 through the second interface 138. In another embodiment, MAP 118 and gateway 114 both communicate through the second interface 138, and MAP 118 and client 102 are on different subnets.

SYN message 48 has address block 140 [S IP=10.0.0.2:200; D IP=123.0.0.1:80; SM=EFGH; DM=WXYZ], as do all messages received from client 102 related to the first TCP connection 124. Upon receiving SYN message 48, NAT 158 sends to a connection database 160 the fact that IP address 10.0.0.2:200 wants to connect to IP address 123.0.0.1:80. NAT 158 also recognizes that the TCP connection related to SYN message 48 will involve a document sent with HTTP protocol because the destination IP address (123.0.0.1:80) of SYN message 48 contains a TCP port 80, which denotes an HTTP-type TCP connection. (Step 49) NAT 158 prepares a SYN message 50 having an address block 142 [S IP=10.0.0.5:XXXX; D IP=10.0.0.1:YYYY; SM=JKLM; DM=ABCD]. NAT 158 dynamically assigns a TCP source port XXXX to the first of a pair of TCP connections, namely TCP connection 124, that will be established in response to the request in SYN message 48 to set up a TCP connection.

All messages from TLB 116 to MAP 118 have address block 142, which contains the IP address and the TCP port used by MAP 118. Note that the destination MAC address of address block 142 is the MAC address of the platform interface 162 of MAP 118, as shown in FIG. 8. Note also that address block 142 contains the source IP address of NAT 158, as well as the dynamically-assigned TCP port used by TCP connection 124. These are denoted as "masquerade" addresses because TLB 116 has neither a network layer, such as an IP layer, nor a transport layer, such as a TCP layer. In the event that more than 65,536/2 pairs of TCP connections pass through TLB 116 to MAP 118, a new masquerade source IP address is assigned to those TCP connections to accommodate each additional 65,536/2 pairs of TCP connections.

TLB 116 forwards SYN message 50 with address block 142 to MAP 118. Message 50 is received by platform interface 162 and travels to a second network address translation (NAT) bridge 164 on MAP 118. NAT 164 forwards message 50 to the TCP/IP layers 170 and 166.

TCP/IP layers 170 and 166 generate a SYN message 51 in response to receiving message 50. SYN message 51 contains a destination TCP port UUUU that is derived from the source TCP port XXXX of message 50. SYN message 51 with address block 150 [S IP=10.0.0.1:VVVV; D IP=10.0.0.5:UUUU; SM=ABCD; DM=JKLM] is sent to TLB 116, which forwards a SYN message 52 via gateway 114 to web server 108 to confirm that the second TCP connection 126 can be set up. SYN message 52 has address block 156 [S IP=10.0.0.2:200; D IP=123.0.0.1:80; SM=EFGH; DM=WXYZ]. Because of the association of ports XXXX and UUUU, TLB 116 assigns address block 156 to SYN message 52. Web server 108 sends a SYN ACK message 53 with address block 154 [S IP=123.0.0.1:80; D IP=10.0.0.2:200; SM=WXYZ; DM=EFGH] via gateway 114 to client 102, which is intercepted by TLB 116. TLB 116 then forwards a SYN ACK message 54 having address block 148 [S IP=10.0.0.5:UUUU; D IP=10.0.0.1:VVVV; SM=JKLM; DM=ABCD] to MAP 118.

The setup of the second TCP connection 126, however, is not initiated at this time. After MAP 118 receives SYN ACK message 54, which confirms that a TCP connection can be established with web server 108, TCP/IP layers 170 and 166 return a RST message 55 to web server 108 via TLB 116. TLB 116 forwards RST message 55 as RST message 56 via gateway 114 to web server 108. RST message 56 resets the setup process, and no TCP connection is established.

After TCP/IP layers 170 and 166 receive SYN ACK message 54 confirming that the second TCP connection 126 can be established, TCP/IP layers 170 and 166 generate a SYN ACK message 57 with address block 144 [S IP=10.0.0.1; YYYY; D IP=10.0.0.5:XXXX; SM=ABCD; DM=JKLM] in order to set up the first TCP connection 124 with client 102. Message 57 is received by TLB 116 and forwarded to client 102 as SYN ACK message 58 with an address block 152 [S IP=123.0.0.1:80; D IP=10.0.0.2:200; SM=WXYZ; DM=EFGH]. Messages from TLB 116 bound for client 102 have address block 152. Message 58 does not have the source MAC address of interface 136, which would normally be required using Ethernet protocol. Address block 152 of message 58 includes the source MAC address of gateway 114 (WXYZ) and the source IP address of web server 108 (123.0.0.1:80), thereby rendering TLB 116 transparent to client 102. Message 58 seems to come directly from gateway 114.

Client 102 responds to SYN ACK message 58 with an ACK message 59, which is forwarded by TLB 116 as ACK message 60 to MAP 118. SYN messages 48 and 50, SYN ACK messages 57 and 58 and ACK messages 59 and 60 thereby establish the first TCP connection 124 between client 102 and TCP layer 170. The first TCP connection 124 terminates on the TCP layer 170 of MAP 118, and the TCP layer assembles all of the frame payloads of individual Ethernet frames that relate to the TCP connection to form a complete data portion. The application protocol handler 172, shown in FIG. 8, can then execute on the complete data portion. In this example, however, ACK message 60 does not carry a frame payload that is part of a data portion for which handling by protocol handler 172 is undertaken. In establishing the first TCP connection 124, client 102 communicates with MAP 118 as though client 102 is connected directly to web server 108.

After establishing the first TCP connection 124, MAP 118 waits for client 102 to make a request of web server 108 before initiating the setup of the second TCP connection 126 between MAP 118 and web server 108. The request comes when client 102 sends a GET message 61 requesting that web server 108 transmit a particular document using HTTP protocol. An example of the syntax of GET message 61 is shown in FIG. 5A. TLB 116 receives GET message 61 and forwards a GET message 62 to the TCP/IP layers 170 and 166 of MAP 118.

Upon receiving GET message 62, the TCP/IP layers 170 and 166 generate three new messages: ACK message 63, SYN message 65, and GET message 71. ACK message 63 and forwarded ACK message 64 acknowledge GET message 62. In this embodiment, TCP/IP layers 170 and 166 send ACK message 63 in response to receiving GET message 62. In another embodiment, TCP/IP layers 170 and 166 wait to send ACK message 63 until ACK message 69 has been sent. This ensures that at least the entire TCP connection (connection 124 and connection 126) has been established before acknowledgement is sent to client 102 that its GET message has been received over that TCP connection.

As explained with reference to FIG. 5A, SYN message 65 initiates the setup of the second TCP connection 126, which is established by SYN messages 65 and 66, SYN ACK messages 67 and 68 and ACK messages 69 and 70. NAT 158 knows to replace address block 150 of SYN message 65 with address block 156 of SYN message 66 because of the association of port XXXX in address block 142 with port UUUU in address block 150. The connection database 160 maintains the associations between pairs of address blocks.

The third message generated by the TCP/IP layers 170 and 166 upon receiving GET message 62 is GET message 71. TCP layer 170, as shown in FIG. 8, sends messages potentially containing data to be processed, such as GET messages and messages containing HTML documents, to the application layer. TCP layer 170 sends GET message 71 to application protocol handler 172, which assembles the frame payloads of individual messages into one of the data portions sent over the TCP connection. Protocol handler 172 can then analyze the entire data portion. Protocol handler 172 then generates a new GET message 72 and routes message 72 to the port UUUU on TCP layer 170 and to the internal IP address 10.0.0.1 on IP layer 166. GET message 72 is communicated across the second TCP connection 126, whereas GET message 62 was received across the first TCP connection 124. TCP/IP layers 170 and 166 then send GET message 73 to TLB 116, which forwards GET message 74 via gateway 114 to web server 108. The receipt of GET message 74 by web server 108 is acknowledged with an ACK messages 75 and 76.

Web server 108 then sends the requested HTML document to client 102. The requested HTML document is contained in message 77 that is forwarded by gateway 114 via interface 138 to NAT 158. NAT 158 sends the HTML document in message 78 via platform interface 162 to TCP/IP layers 170 and 166 of MAP 118. In this example, the entire document is delivered in the frame payload of message 78. In another embodiment, the frame payloads of multiple Ethernet frames together comprise one of the data portions sent over the TCP connection, for example, an entire HTML document. TCP layer 170 recognizes that message 78 conforms to HTTP protocol because message 78 was ultimately generated in response to message 62, which contained source TCP port YYYY, which was designated as HTTP.

TCP/IP layers 170 and 166 then forward message 78 as message 79 to application protocol handler 172. Message 79 includes the data portion, as well as information regarding the type of data. Protocol handler 172 stores the data portion in a storage area 176, which can be a RAM disk. In this embodiment, protocol handler 172 causes an anti-virus engine 174 to execute an application layer program on the data portion. In this example, the application layer program searches for computer viruses in HTML documents sent using HTTP protocol.

In FIG. 8, a second storage area is shown in addition to the RAM disk 176. A connection database 168 can be included in MAP 188 to provide for additional features. For example, messages from addresses known to have sent viruses can be quarantined in the connection database 168 to await arrival of the appropriate anti-virus program to remove the virus from the data portion sent with the messages.

Other application layer programs search for computer viruses in data portions sent with SMTP, NNTP or other protocol messages. Moreover, application layer programs can perform functions other than searching for viruses in data portions sent over TCP communications. For example, a filter program in the application layer of MAP 118 can perform the same function as a filtering firewall. One such filter program searches for specific words in HTML documents and instructs the protocol handler 172 not to forward messages with frame payloads that include parts of data portions containing offending HTML documents.

If the anti-virus engine 174 does not find a computer virus in the data portion contained in message 79, i.e., the HTML document, protocol handler 172 creates a new message 80 containing the same data portion. In the embodiment where that data portion is transmitted in multiple frame payloads, individual frame payloads of message 80 that make up the data portion are not necessarily the same size as the corresponding frame payloads of message 79. In that case, the data portion that arrived in frame payloads of message 79 can be broken up and transmitted in Ethernet frames of message 80 having different sizes.

Message 80 is sent to TCP layer 170 through a socket that has been assigned by TCP layer 170 for use with the particular dynamically-assigned internal TCP port associated with each TCP connection. TCP/IP layers 170 and 166 then generate a message 81 containing the HTML document. Both messages 80 and 81 have address block 144. TCP/IP layers 170 and 166 send message 81 to TLB 116, which forwards message 81 as message 82 having address block 152 to client 102. The HTML document is thereby received transparently by client 102 as through it came directly from web server 108.

As shown in FIGS. 5B and 6, MAP 118 can acknowledge to web server 108 that the HTML document has been received even before client 102 receives the HTML document. For example, MAP 118 sends out ACK message 83, which is forwarded by TLB 116 to web server 108 as ACK message 84, before ACK message 85 is received from client 102 by TLB 116 and before MAP 118 receives ACK message 86 from TLB 116. In other embodiments, the timing of sending acknowledgments across TCP connection 126 can be delayed until the corresponding acknowledgment has been received on the TCP connection 124, and visa versa.

Web server 108 sends a FIN message that is forwarded by gateway 114 as FIN message 87. FIN message 87 indicates that the entire requested HTML document has been sent and that the TCP connection is to be terminated. TLB 116 sends FIN message 88 to MAP 118. TCP layer 170 receives FIN message 88 and returns FIN message 89, which is forwarded by TLB 116 as FIN message 90 to client 102.

Once TCP layer 170 of MAP 118 receives FIN message 88, the timing for sending messages to terminate the first TCP connection 124 need not depend on the times at which messages to terminate the second TCP connection 126 are received by the TCP layer 170. In this embodiment, MAP 118 sends out FIN ACK message 91, which is forwarded by TLB 116 to web server 108 as FIN ACK message 92, before FIN ACK message 93 is received from client 102 by TLB 116 and before MAP 118 receives FIN ACK message 94 from TLB 116. Similarly, MAP 118 can acknowledge to client 102 that web server 108 received a FIN ACK message even before MAP 118 has received such acknowledgment from web server 108. MAP 118 sends out ACK message 95, which is forwarded by TLB 116 to client 102 as ACK message 96, before ACK message 97 is received from client 102 by TLB 116 and before MAP 118 receives ACK message 98 from TLB 116. In other embodiments, the timing for sending these TCP messages can be different. The receipt of ACK message 96 by client 102 terminates the first TCP connection 124. The receipt of ACK message 98 by TCP layer 170 terminates the second TCP connection 126.

Although the present invention has been described in connection with certain specific embodiments for instructional purposes, the present invention is not limited thereto. In one specific embodiment, for example, the timing for sending signaling messages, e.g., SYN, SYN ACK, ACK and GET, with respect to the first TCP connection is largely independent of when signaling messages are sent with respect to the second TCP connection. In such an embodiment, it is possible that a connection is acknowledged that cannot later be established. In that case, robustness is sacrificed for a faster responsiveness perceived by client 102. In another embodiment, the transparent load balancer and the multi-application platforms are not based on Ethernet, IP and TCP layers, but rather on a packet radio data link layer and a UDP transport layer. In yet another embodiment, the data portion communicated across the first and second TCP connections is an application file. Accordingly, various modifications, adaptations, and combinations of various features of the described embodiments can be practiced without departing from the scope of the invention as set forth in the claims.

What is claimed is:

1. A method, comprising:
   receiving a plurality of first incoming frames, each of the first incoming frames carrying a frame payload and having an incoming source IP address, an incoming source MAC address, an incoming destination IP address and an incoming destination MAC address;
   forwarding all of the first incoming frames to a first application platform, a first TCP connection being terminated on the first application platform, the frame payloads of the first incoming frames together comprising a first data portion, the first data portion being communicated across the first TCP connection;
   receiving a plurality of first outgoing frames from the first application platform, each of the first outgoing frames carrying a frame payload, the frame payloads of the first outgoing frames together comprising the first data portion; and
   outputting the first outgoing frames, each of the first outgoing frames having an outgoing source IP address that is identical to the incoming source IP address, an outgoing source MAC address that is identical to the incoming source MAC address, an outgoing destination IP address that is identical to the incoming destination IP address and an outgoing destination MAC address that is identical to the incoming destination MAC address.

2. The method of claim 1, wherein the first data portion is a data accumulation representing a voice communication.

3. The method of claim 1, wherein the first outgoing frames are output across a second TCP connection, the first TCP connection being defined by a first TCP source port and a first TCP destination port, the second TCP connection being defined by the same first TCP source port and the same first TCP destination port.

4. The method of claim 3, further comprising:
   receiving a plurality of second incoming frames, each of the second incoming frames carrying a frame payload and having a second source IP address, a second source MAC address, a second destination IP address and a second destination MAC address;
   forwarding all of the second incoming frames to a second application platform, a third TCP connection being terminated on the second application platform, the frame payloads of the second incoming frames together comprising a second data portion, the second data portion being communicated across the third TCP connection;
   receiving a plurality of second outgoing frames from the second application platform, each of the second outgoing frames carrying a frame payload, the frame payloads of the second outgoing frames together comprising the second data portion; and
   outputting the second outgoing frames, each of the second outgoing frames having a source IP address that is identical to the second source IP address, a source MAC address that is identical to the second source MAC address, a destination IP address that is identical to the second destination IP address and a destination MAC address that is identical to the second destination MAC address.

5. The method of claim 4, wherein the second outgoing frames are output across a fourth TCP connection, the third TCP connection being defined by a third TCP source port and a third TCP destination port, the fourth TCP connection being defined by the same third TCP source port and the same third TCP destination port.

6. A load balancer, comprising:
   a first interface that receives a plurality of first incoming frames each having a frame payload, the frame payloads of the first incoming frames together comprising a first data portion, the first data portion being communicated across a first TCP connection, each of the first incoming frames having an incoming source IP address, an incoming source MAC address, an incoming destination IP address and an incoming destination MAC address;
   an address translator that gives the first incoming frames a destination IP address and a destination MAC address of a first application platform, the first TCP connection being terminated on the first application platform, the first interface outputting the first incoming frames, the first interface receiving a plurality of first outgoing frames from the first application platform, the first outgoing frames each having a frame payload, the frame payloads of the first outgoing frames together comprising the first data portion, the address translator giving the first outgoing frames the incoming source IP address, the incoming source MAC address, the incoming destination IP address and the incoming destination MAC address; and
   a second interface that outputs the first outgoing frames.

7. The load balancer of claim 6, wherein the first data portion is a data accumulation representing a voice communication.

8. The load balancer of claim 6, wherein the first interface receives a plurality of second incoming frames each having a frame payload, the frame payloads of the second incoming frames together comprising a second data portion, the second data portion being communicated across a third TCP connection, each of the second incoming frames having a second source IP address, a second source MAC address, a second destination IP address and a second destination MAC address, the address translator giving the second incoming frames a destination IP address and a destination MAC address of a second application platform, the third TCP connection being terminated on the second application platform, the first interface outputting the second incoming frames, the first interface receiving a plurality of second outgoing frames from the second application platform, the second outgoing frames each having a frame payload, the frame payloads of the second outgoing frames together comprising the second data portion, the address translator giving the second outgoing frames the second source IP address, the second source MAC address, the second destination IP address and the second destination MAC address, the second interface outputting the second outgoing frames.

9. The load balancer of claim 6, wherein the first application platform uses a platform IP address, the platform IP address differing from the incoming destination IP address.

10. The load balancer of claim 6, wherein the first TCP connection is defined by a first TCP source port and a first TCP destination port, and wherein the first outgoing frames are output from the second interface across a second TCP connection, the second TCP connection being defined by the first TCP source port and the first TCP destination port.

11. The load balancer of claim 10, wherein the first TCP connection extends through the load balancer to the first application platform, and wherein the second TCP connection extends from the first application platform through the load balancer.

12. A system, comprising:
a first multi-application platform that terminates a first TCP connection and originates a second TCP connection, the first TCP connection having a first TCP source port and the second TCP connection having a second TCP destination port; and
a transparent load balancer that receives first incoming frames and second incoming frames, the transparent load balancer diverting the first incoming frames to the first multi-application platform, the first incoming frames each having an incoming source IP address, an incoming source MAC address, an incoming destination IP address and an incoming destination MAC address and being communicated across the first TCP connection, the first TCP connection having the second TCP destination port as a TCP destination port,
wherein the transparent load balancer receives first outgoing frames from the first multi-application platform and sends the first outgoing frames with an outgoing source IP address that is identical to the incoming source IP address, an outgoing source MAC address that is identical to the incoming source MAC address, an outgoing destination IP address that is identical to the incoming destination IP address and an outgoing destination MAC address that is identical to the incoming destination MAC address to the second TCP destination port.

13. The system of claim 12, wherein each of the first incoming frames carries a frame payload, the frame payloads of the first incoming frames together comprising a first data portion, the first multi-application platform containing a program, the program operating on the data portion.

14. The system of claim 12, further comprising:
a second multi-application platform that terminates a third TCP connection and originates a fourth TCP connection, the third TCP connection having a third TCP source port and the fourth TCP connection having a fourth TCP destination port, the transparent load balancer diverting the second incoming frames to the second multi-application platform, the second incoming frames being communicated across the third TCP connection, the third TCP connection having the fourth TCP destination port as a TCP destination port.

15. The system of claim 14, wherein the transparent load balancer receives first outgoing frames from the first multi-application platform and sends the first outgoing frames to the second TCP destination port, and receives second outgoing frames from the second multi-application platform and sends the second outgoing frames to the fourth TCP destination port.

16. The system of claim 15, wherein each of the first incoming frames carries a frame payload, the frame payloads of the first incoming frames together comprising a first data portion, each of the first outgoing frames carrying a frame payload, the frame payloads of the first outgoing frames together comprising the first data portion.

17. The system of claim 16, wherein the first data portion is a data accumulation representing a voice communication.

18. The system of claim 16, wherein the first data portion is an application file.

* * * * *